United States Patent
Mori

(10) Patent No.: US 9,789,732 B2
(45) Date of Patent: Oct. 17, 2017

(54) HEAVY LOAD TIRE

(71) Applicant: BRIDGESTONE CORPORATION, Tokyo (JP)

(72) Inventor: Yosuke Mori, Kawasaki (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/762,651

(22) PCT Filed: Feb. 5, 2014

(86) PCT No.: PCT/JP2014/000609
§ 371 (c)(1),
(2) Date: Jul. 22, 2015

(87) PCT Pub. No.: WO2014/122927
PCT Pub. Date: Aug. 14, 2014

(65) Prior Publication Data
US 2015/0360516 A1    Dec. 17, 2015

(30) Foreign Application Priority Data
Feb. 6, 2013   (JP) .................................. 2013-021314

(51) Int. Cl.
*B60C 9/28* (2006.01)
*B60C 9/20* (2006.01)
*B60C 9/22* (2006.01)
*B60C 5/00* (2006.01)
*B60C 11/04* (2006.01)

(52) U.S. Cl.
CPC ................. *B60C 9/20* (2013.01); *B60C 5/00* (2013.01); *B60C 9/2006* (2013.01); *B60C 9/22* (2013.01);
(Continued)

(58) Field of Classification Search
CPC ..... Y10T 152/10792; Y10T 152/10801; Y10T 152/10783; B60C 2009/2209–2009/2295;
(Continued)

(56) References Cited

U.S. PATENT DOCUMENTS 2,982,328 A * 5/1961 Mazza
3,175,598 A * 3/1965 Cegnar .................... B60C 9/20
152/535
(Continued)

FOREIGN PATENT DOCUMENTS

CN          1990278 A    7/2007
CN        102463849 A    5/2012
(Continued)

OTHER PUBLICATIONS

English machine translation of FR 1.356.041, Feb. 10, 1964.*
International Search Report for PCT/JP2014/000609 dated Apr. 1, 2014 [PCT/ISA/210].

*Primary Examiner* — Adrienne C Johnstone
(74) *Attorney, Agent, or Firm* — Sughrue Mion, PLLC

(57) ABSTRACT

A first belt layer includes a cord extending at an inclination angle of greater than 45° with respect to the tire circumferential direction, a second belt layer includes a cord extending in the tire circumferential direction, and a third belt layer includes a cord extending at an inclination angle of 30° or less in the opposite direction from the cord of the first belt layer with respect to the tire circumferential direction. The belt layers are arranged in order, with the first belt layer furthest inward in the tire radial direction, on the outer circumferential side of a crown region of a carcass extending toroidally between a pair of bead portions. The third belt layer width $w_3$ is 80% or more of the tread width w, and $w_2 < w_1 < w_3$, where $w_1$ is the first belt layer width, and $w_2$ is the second belt layer width.

18 Claims, 2 Drawing Sheets

(52) U.S. Cl.
CPC ............... *B60C 9/28* (2013.01); *B60C 11/04* (2013.01); *B60C 2009/2012* (2013.01); *B60C 2009/2016* (2013.01); *B60C 2009/2019* (2013.01); *B60C 2009/229* (2013.01); *B60C 2200/06* (2013.01); *Y10T 152/10792* (2015.01); *Y10T 152/10801* (2015.01)

(58) Field of Classification Search
CPC .... B60C 2009/2012; B60C 2009/2016; B60C 2009/2019; B60C 2009/2022; B60C 9/22; B60C 9/2204; B60C 9/28; B60C 9/20; B60C 9/2003; B60C 9/2006; B60C 9/2009; B60C 9/26; B60C 9/18
USPC ........ 152/534, 535, 531, 533, 538, 528, 529
See application file for complete search history.

(56) References Cited

U.S. PATENT DOCUMENTS

| | | | |
|---|---|---|---|
| 3,580,319 A * | 5/1971 | Gorter | B60C 9/20 152/535 |
| 5,772,810 A * | 6/1998 | Cluzel | 152/534 X |
| 6,668,889 B1 | 12/2003 | Losey et al. | |
| 2006/0169381 A1* | 8/2006 | Radulescu | |
| 2008/0271829 A1 | 11/2008 | Kobayashi | |
| 2010/0116402 A1* | 5/2010 | Isobe | |
| 2010/0282389 A1* | 11/2010 | Johnson | |
| 2013/0042954 A1* | 2/2013 | Becker | 152/535 |
| 2014/0326375 A1 | 11/2014 | Okabe | |
| 2015/0122392 A1* | 5/2015 | Kozuki | B60C 9/22 152/531 X |
| 2016/0303915 A1* | 10/2016 | Lacko | B60C 9/22 |

FOREIGN PATENT DOCUMENTS

| | | | |
|---|---|---|---|
| DE | 10 2010 000 471 A1 | * | 8/2011 |
| FR | 1.356.041 | * | 2/1964 |
| JP | 2003-517963 A | | 6/2003 |
| JP | 2011-162023 A | | 8/2011 |
| JP | 5029787 B1 | | 9/2012 |
| WO | 2006/103831 A1 | | 10/2006 |
| WO | 2011/131383 A1 | | 10/2011 |
| WO | 2012055598 A1 | | 5/2012 |
| WO | WO-2013/161296 A1 | * | 10/2013 |

* cited by examiner

HEAVY LOAD TIRE

CROSS REFERENCE TO RELATED APPLICATIONS

This application is a National Stage of International Application No. PCT/JP2014/000609, filed on Feb. 6, 2014, which claims priority from Japanese Patent Application No. 2013-021314, filed on Feb. 6, 2013, the contents of all of which are incorporated herein by reference in their entirety.

TECHNICAL FIELD

This disclosure relates to a heavy load tire with belt layers provided on the outer circumferential side of a crown region of a carcass extending toroidally between a pair of bead portions.

BACKGROUND

JP 2011-162023 A (PTL 1), for example, proposes a pneumatic tire as a heavy load tire used in trucks, buses, and the like. This pneumatic tire prevents the occurrence of local wear on the tread surface, while improving the fatigue resistance of cords in particular at the width direction edge of the circumferential belt layer.

CITATION LIST

Patent Literature

PTL 1: JP 2011-162023 A

With respect to such a heavy load tire, however, there is a demand for techniques to further suppress shoulder edge wear (wear near the tire ground contact edge of the shoulder portions), which is a type of uneven wear, while maintaining other properties, in particular plunger durability (durability with respect to projection input).

In order to effectively address the above-described issues, I provide a heavy load tire that can sufficiently suppress shoulder edge wear while maintaining plunger durability.

SUMMARY

My heavy load tire includes: a first belt layer including a cord extending at an inclination of greater than 45° with respect to a tire circumferential direction; a second belt layer including a cord extending in the tire circumferential direction; and a third belt layer including a cord extending at an inclination of 30° or less in an opposite direction from the cord of the first belt layer with respect to the tire circumferential direction, such that the first belt layer, second belt layer, and third belt layer are arranged in order, with the first belt layer furthest inward in a tire radial direction, on an outer circumferential side of a crown region of a carcass, a width $w_3$ of the third belt layer is 80% or more of a tread width w, and $w_2 < w_1 < w_3$, where $w_1$ is a width of the first belt layer, and $w_2$ is a width of the second belt layer.

In this disclosure, dimensions such as the width of each belt layer refer to dimensions measured on a tire mounted on an applicable rim, with specified internal pressure and no load applied.

Furthermore, in this disclosure, the "tread width" refers to the length in the width direction between tread edges when measuring in the above-mentioned state. The "tread edges" refer to the outermost tire ground contact positions in the tire width direction in the tire ground contact area when a load corresponding to the maximum load capability is applied to a tire mounted on an applicable rim with specified internal pressure applied.

In this disclosure, stating that the cords of the belt layer "extend in the tire circumferential direction" includes not only the case of the cords of the belt layer extending in the tire circumferential direction, but also the case of the cords of the belt layer extending substantially in the tread circumferential direction by being inclined at an angle of less than 10° with respect to the tire circumferential direction.

As used herein, an "applicable rim" refers to a rim specified by the standards below in accordance with tire size. The "applicable rim" refers to a standard rim ("approved rim" or "recommended rim") of applicable size specified in accordance with valid industrial standards for the region in which the tire is produced or used, such as "The Tire and Rim Association, Inc. Year Book" in the United States of America, "The European Tyre and Rim Technical Organisation Standards Manual" in Europe, and the "JATMA Year Book" of the Japan Automobile Tire Manufacturers Association in Japan. "Specified internal pressure" refers to air pressure specified by the above standards in accordance with the maximum load capability. The "maximum load capability" refers to the maximum mass that the tire is allowed to bear according to the above standards.

My heavy load tire sufficiently suppresses shoulder edge wear while maintaining plunger durability.

DETAILED DESCRIPTION

Figure 1:
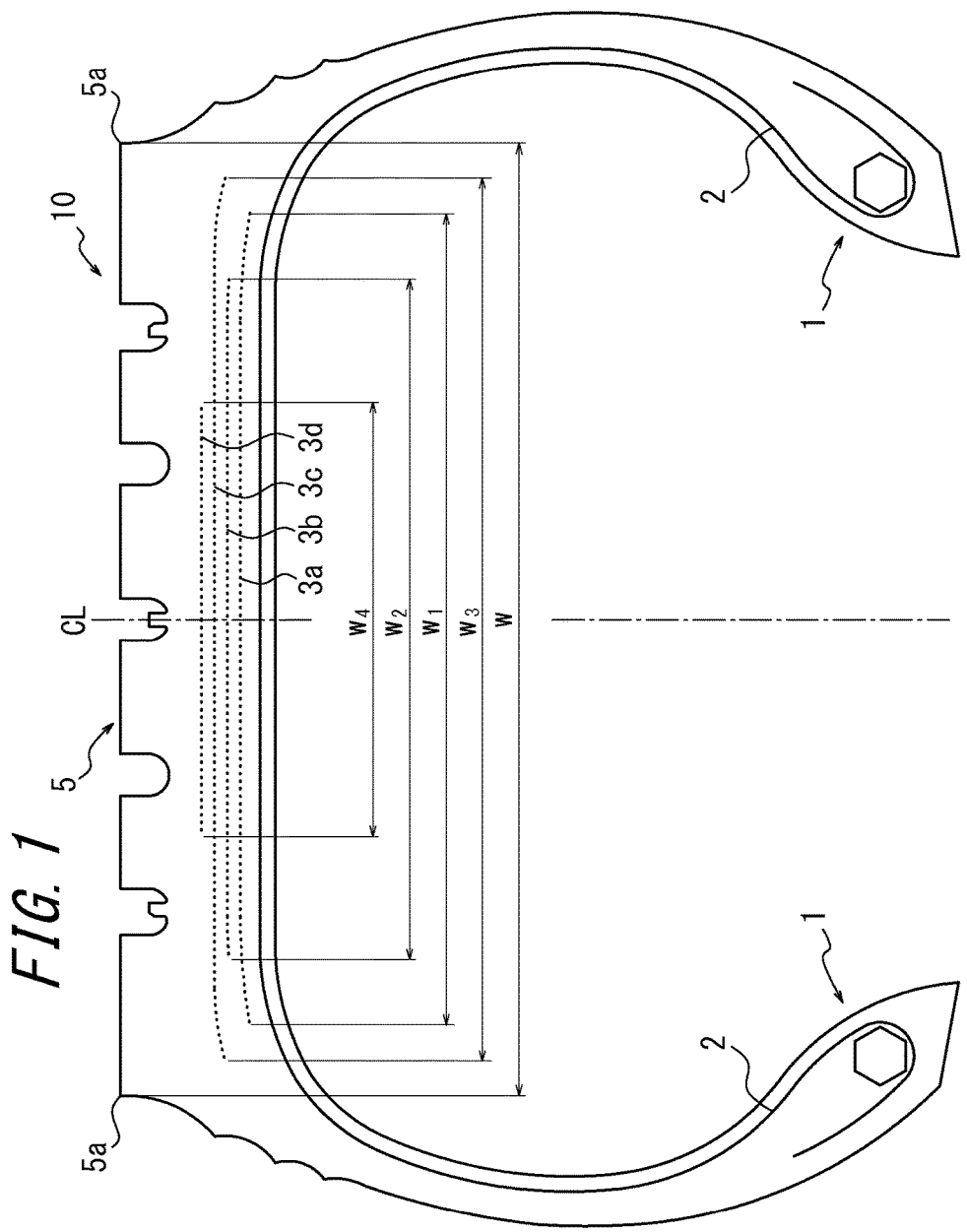
FIG. 1 is a cross-sectional diagram in the tire width direction of an embodiment of my heavy load tire.

An embodiment of my heavy load tire will be described below with reference to the drawings. The heavy load tire 10 of the embodiment illustrated in FIG. 1 is used particularly as a truck and bus tire. A carcass 2 is formed by one or more carcass plies extending toroidally between a pair of bead portions 1, and on the outer circumferential side of a crown region of the carcass 2, first to fourth belt layers 3a to 3d are arranged in order, with the first belt layer 3a furthest inward in the tire radial direction. Tread rubber is disposed on the outer side of the first to fourth belt layers 3a to 3d in the tire radial direction. The entire area including the crown region of the carcass, the first to fourth belt layers 3a to 3d, and the tread rubber constitute a tread portion 5 that is the crown region of the tire. As illustrated in FIG. 1, the carcass 2 is directly adjacent to the first belt layer 3a in the tire radial direction, the first belt layer 3a is directly adjacent to the second belt layer 3b in the tire radial direction, the second belt layer 3b is directly adjacent to the third belt layer 3c in the tire radial direction, and the third belt layer 3c is directly adjacent to the fourth belt layer 3d in the tire radial direction.

Figure 2:
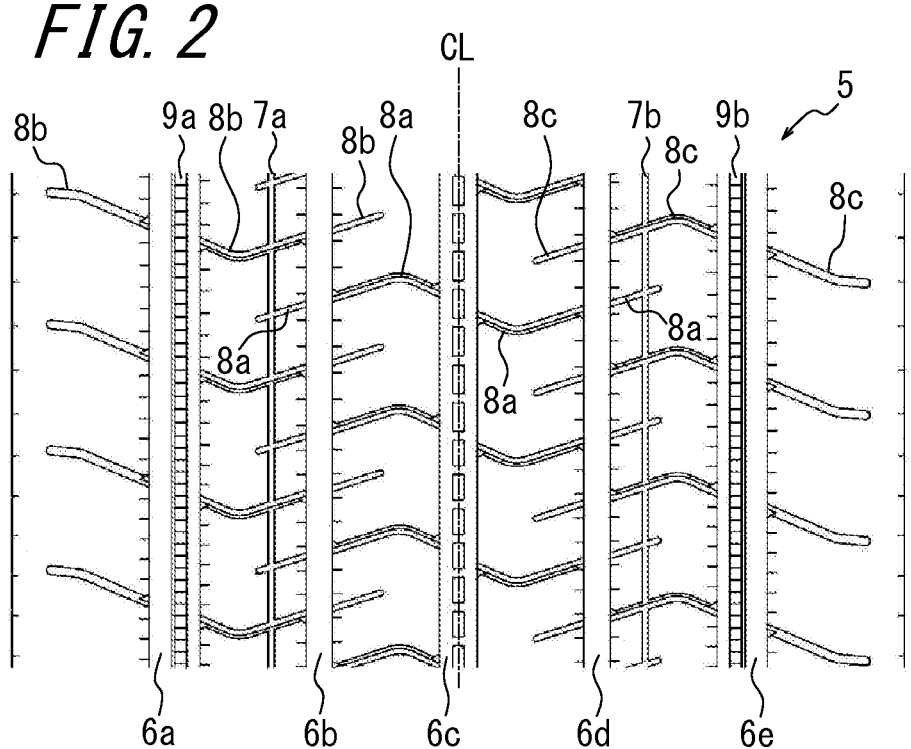
FIG. 2 is a partial development view illustrating the tread pattern of the heavy load tire in FIG. 1.

As illustrated in FIG. 2, five circumferential grooves 6a to 6e extending in the tire circumferential direction, narrow grooves 7a and 7b extending in the tire circumferential direction, and narrow grooves 8a to 8c inclined at a small angle with respect to the tire width direction and extending in a zigzag manner are formed on the outer surface of the tread portion 5. The narrow grooves 8a are in communication with the three circumferential grooves 6b to 6d near the tire equatorial plane CL and with the narrow grooves 7a and 7b. The narrow grooves 8b and 8c are each in communication with two circumferential grooves outward in the tire width direction (with 6a and 6b, or with 6d and 6e) and with one of the narrow grooves 7a and 7b.

Protrusions 9a and 9b extending in the tire circumferential direction are formed respectively in the circumferential grooves 6a and 6b outward on either side in the tire width direction. In the protrusions 9a and 9b, multiple sipes extending in the tire width direction are formed.

In my heavy load tire, however, the tread pattern formed on the outer surface of the tread portion 5 is not limited to the above-described configuration.

The first to fourth belt layers 3a to 3d illustrated in FIG. 1 are each formed by covering one or more cords with rubber. The cord(s) of the first belt layer 3a extend at an inclination angle of greater than 45° with respect to the tire circumferential direction. The cord(s) of the second belt layer 3b extend in the tire circumferential direction. The cord(s) of the third belt layer 3c extend at an inclination angle of 30° or less in the opposite direction from the cord(s) of the first belt layer 3a with respect to the tire circumferential direction. The cord(s) of the fourth belt layer 3d extend at an inclination with respect to the tire circumferential direction.

When the cords extend in a wavelike pattern or the like, the center line of the amplitude of the cords becomes the direction of extension.

The belt layers in which the cord(s) extend at a relatively small angle with respect to the tire circumferential direction, in particular at least the second belt layer 3b, may be formed by spirally winding, on the outer circumferential side of the carcass 2, a strip made of one or more cords, such as steel cords, covered in rubber.

The width $w_3$ of the third belt layer is 80% or more of the tread width w. The widths $w_1$ to $w_3$ of the first to third belt layers satisfy the relationship $w_2<w_1<w_3$.

The effects achieved by the heavy load tire 10 of this embodiment are now described.

Typically, in a pneumatic tire, the radius of the tread portion decreases from the center towards the shoulder portions. Due to this difference in radius, a difference in rolling speed between the center portion and the shoulder portions occurs when the tire is rolling, and shear force in the braking direction occurs in the shoulder portions, where the rolling speed is small with respect to the road travel distance. Due to this sheer force, uneven wear tends to occur in the shoulder portions.

In the heavy load tire 10 of this embodiment, the cord(s) of the third belt layer 3c are inclined in the opposite direction from the cord(s) of the first belt layer 3a with respect to the tire circumferential direction, and the width $w_2$ of the second belt layer 3b is smaller than the widths $w_1$ and $w_3$ of the first and third belt layers 3a and 3c. As a result, the cord(s) of the first belt layer 3a and the cord(s) of the third belt layer 3c cross at the shoulder portions, thereby increasing the in-plane flexural rigidity (rigidity of the layered belt with respect to flexing in the in-plane direction). To further increase this effect, the width $w_2$ of the second belt layer 3b is preferably 90% or less, more preferably 85% or less, of the tread width. The inclination angle of the cord(s) in the third belt layer 3c with respect to the tire circumferential direction is preferably 10° or more.

The cord(s) of the third belt layer 3c are inclined at an angle of 30° or less with respect to the tire circumferential direction. The width $w_3$ of the third belt layer 3c is greater than the width $w_1$ of the first belt layer 3a, and $w_3$ is 80% or more of the tread width. With this structure, the out-of-plane flexural rigidity in the tire circumferential direction up to locations near the tread edges 5a (the rigidity of the shoulder portions of the belt with respect to flexing outward in the tire radial direction) can be guaranteed, while up to positions near the tread edges 5a, the flexural center is positioned further outward in the tire radial direction, near the third belt layer 3c in this embodiment, and the shear force in the braking direction can be mitigated near the tread edges 5a. As a result of these effects, shoulder edge wear can be sufficiently suppressed in the heavy load tire 10 of this embodiment.

In order to further increase the above-described effect of suppressing shoulder edge wear, the width $w_3$ of the third belt layer 3c is preferably 90% or more of the tread width, and the inclination angle of the cord(s) in the third belt layer 3c with respect to the tire circumferential direction is preferably 25° or less. The inclination angle of the cord(s) in the first belt layer 3a with respect to the circumferential direction is preferably 55° or less. Also, the width $w_1$ of the first belt layer 3a is preferably 100% or less of the tread width.

From the perspective of guaranteeing tire durability, the width $w_3$ of the third belt layer 3c is preferably 105% or less of the tread width.

The cord(s) of the first belt layer 3a, which is nearest the carcass, are inclined at an angle of greater than 45° with respect to the tire circumferential direction. As a result, the plunger durability of the tire can be guaranteed. In order to further increase the plunger durability of the tire, the width $w_1$ of the first belt layer is preferably 70% or more, more preferably 85% or more, of the tread width.

The cord(s) of the second belt layer 3b extend in the tire circumferential direction.

When internal pressure is applied, in particular when the tires rotate with load applied thereon, tension acts on these cord(s), suppressing elongation deformation of the tire. Hence, the shape of the tire is maintained. To further increase this effect, the width $w_2$ of the second belt layer 3b is preferably 50% or more, more preferably 60% or more, of the tread width.

From the perspective of increasing the braking strength of the cord(s), the cord(s) of the second belt layer 3b preferably extend in a wavelike pattern. Similarly, from the perspective of increasing the fracture resistance of the cord(s), high elongation cords (for example, cords with a rate of elongation of 4.5% to 5.5% upon rupture) are preferably used for the cord(s) of the second belt layer 3b.

In the heavy load tire 10 of this embodiment, the fourth belt layer 3d in which cord(s) extend at an inclination with respect to the tire circumferential direction is disposed outward in the tire radial direction from the third belt layer 3c. The belt width $w_4$ of the fourth belt layer 3d and the direction of extension of the cord(s) may be set freely in accordance with the function to be improved. For example, the shoulder edge wear can be further suppressed with the fourth belt layer 3d.

From the perspective of improving steering stability by increasing the side force, as well as further heightening the in-plane flexural rigidity and further suppressing the shoulder edge wear, the cord(s) of the fourth belt layer 3d are preferably inclined in the opposite direction from the third belt layer 3c with respect to the tire circumferential direction, so that the cord(s) of the third belt layer 3c and the cord(s) of the fourth belt layer 3d cross. To further increase this effect, the inclination angle of the cord(s) in the fourth belt layer 3d with respect to the tire circumferential direction is preferably 70° or less and is even more preferably 15° or more to 55° or less. The width $w_4$ of the fourth belt layer 3d is more preferably 20% or more, even more preferably 30% or more, of the tread width w.

From the perspective of preventing the ends of the belt layers from overlapping and of improving the durability of the belt layer ends, the width $w_4$ of the fourth belt layer 3d is preferably smaller than the width $w_2$ of the second belt layer 3b. Furthermore, the width $w_4$ of the fourth belt layer 3d is more preferably 70% or less, even more preferably 55% or less, of the tread width w.

From the perspective of strength, steel cords are preferable for the cord(s) used in the first belt layer 3a and/or the third belt layer 3c. While any steel cords may be used, the cords that are used may be such that the relative rate of elongation under a tensile force equivalent to 10% of the breaking load is 0.3% to 2% when the cords are not covered with rubber.

When applying this disclosure to a tire with an aspect ratio of 65 or less, the shoulder edge wear can be suppressed in a particularly effective way.

EXAMPLES

Example Tires and Comparative Tires with a size of 355/50R22.5 were prepared to have the specifications listed below. A shoulder edge wear resistance test, plunger durability test, belt layer end durability test, and steering stability test were performed on each sample tire, as described below.

In Example Tires 1 to 11, as illustrated in FIGS. 1 and 2, a first belt layer including a cord extending at an inclination angle of 50° with respect to the tire circumferential direction, a second belt layer including a cord extending in the tire circumferential direction, and a third belt layer including a cord extending at an inclination angle of 30° or less in the opposite direction from the cord of the first belt layer with respect to the tire circumferential direction are arranged in order, with the first belt layer furthest inward in the tire radial direction, on the outer circumferential side of a crown region of a carcass extending toroidally between a pair of bead portions. Furthermore, $w_2 < w_1 < w_3$, where $w_1$ to $w_3$ are the widths of the first to third belt layers. Steel cords such that the relative rate of elongation under a tensile force equivalent to 10% of the breaking load is 0.46% when the cords are not covered with rubber are used in the first belt layer and the third belt layer.

A fourth belt layer with width $w_4$ is also provided in Example Tires 1 and 3 to 11. In Example Tires 1 to 10, the cord of the second belt layer extends in the tire circumferential direction in a wavelike pattern. In Example Tire 11, the cord of the second belt layer extends in the tire circumferential direction linearly.

Comparative Tire 1 has the same structure as Example Tire 1, except that the width $w_3$ of the third belt layer is 74% (226 mm) of the tread width w.

Comparative Tire 2 has the same structure as Example Tire 1, except that the cord in the third belt layer extends at an inclination angle of 52° in the opposite direction from the cord of the first belt layer with respect to the tire circumferential direction.

Comparative Tire 3 has the same structure as Example Tire 1, except that the cord in the first belt layer extends at an inclination angle of 16° with respect to the tire circumferential direction.

Comparative Tire 4 has the same structure as Example Tire 1, except that the width $w_1$ of the first belt layer is 60% (184 mm) of the tread width w, and $w_1 < w_2$.

In Comparative Tire 5, first and second belt layers each including a cord extending in the tire circumferential direction, a third belt layer including a cord extending at an inclination angle of 52° with respect to the tire circumferential direction, and a fourth belt layer including a cord extending at an inclination angle of 52° in the opposite direction from the cord of the third belt layer with respect to the tire circumferential direction are arranged in order, with the first belt layer furthest inward in the tire radial direction, on the outer circumferential side of a crown region of a carcass extending toroidally between a pair of bead portions. The widths $w_1$ to $w_4$ of the first to fourth belt layers are respectively 74% (226 mm), 74% (226 mm), 95% (290 mm), and 85% (260 mm) of the tread width w (305 mm). In all other respects, Comparative Tire 5 has the same structure as Example Tire 1.

Table 1 lists the specifications of each of the above-described Example Tires and Comparative Tires. Basically, the sign of the cord inclination angle of the first to fourth belt layers with respect to the tire circumferential direction as listed in Table 1 is positive for the case of being inclined with respect to the tire circumferential direction in the same direction as the cord of the first belt layer and negative for the case of being inclined in the opposite direction. With respect to Comparative Tire 5, however, the sign indicates that the cord of the third belt layer and the cord of the fourth belt layer are inclined in opposite directions from each other with respect to the tire circumferential direction, with the cord inclination angle of the third belt layer being defined as positive.

Each of the above sample tires was mounted on a rim with a rim size of 11.75 inches, and under the conditions of an internal pressure of 900 kPa and a load of 4000 kgf, the following evaluations were made.

<Shoulder Edge Wear Resistance Test>

Example Tires 1 to 11 and Comparative Tires 1 to 5 were mounted on the steering shaft of a vehicle, and after actually driving the vehicle 100,000 km on public roads, the amount of wear at the tread edge (amount of change in height in the tire radial direction; the same holds below) and the amount of wear in the center block (amount of change in the depth of the shoulder main groove) were each measured. The inverse of the difference between these two amounts of wear was compared between the sample tires to evaluate the shoulder edge wear resistance. Table 1 lists the evaluation results, with the test result for Comparative Tire 5 being 100. A larger numerical value indicates better shoulder edge wear resistance.

<Plunger Durability Test>

For Example Tires 1 to 11 and Comparative Tires 1 to 5, based on a breaking energy test as prescribed in JIS D 4230, a plunger was pressed against the tread portion, and the pressing force and displacement of the plunger immediately before the tire broke were examined. By converting the product of the pressing force and the displacement into an index, a relative evaluation was made, with the test result for Comparative Tire 5 as 100. Table 1 lists the evaluation results. A larger numerical value indicates better plunger durability.

<Belt Layer End Durability Test>

Example Tires 1 to 4 were mounted in an outside drum tester, and after driving 20,000 km, the length of a crack occurring between the edge of the third belt layer in the tire width direction and the edge of the second belt layer in the tire width direction was measured. The inverse of this length was compared between the sample tires to evaluate the belt layer end durability. Table 1 lists the evaluation results, with the test result for Example Tire 2 being 100. A larger numerical value indicates better belt layer end durability.

<Steering Stability Test>

Using a flat belt cornering tester, the cornering power for Example Tires 1 to 4 was measured, and a relative evaluation of the steering stability was made, with the cornering power of Example Tire 2 as 100. Table 1 lists the evaluation results. A larger numerical value indicates better steering stability.

results for the shear force in the braking direction on the shoulder portion when changing the aspect ratio for Example Tire 1. As the shear force in the braking direction approaches zero, shoulder edge wear tends to occur less.

Figure 3:
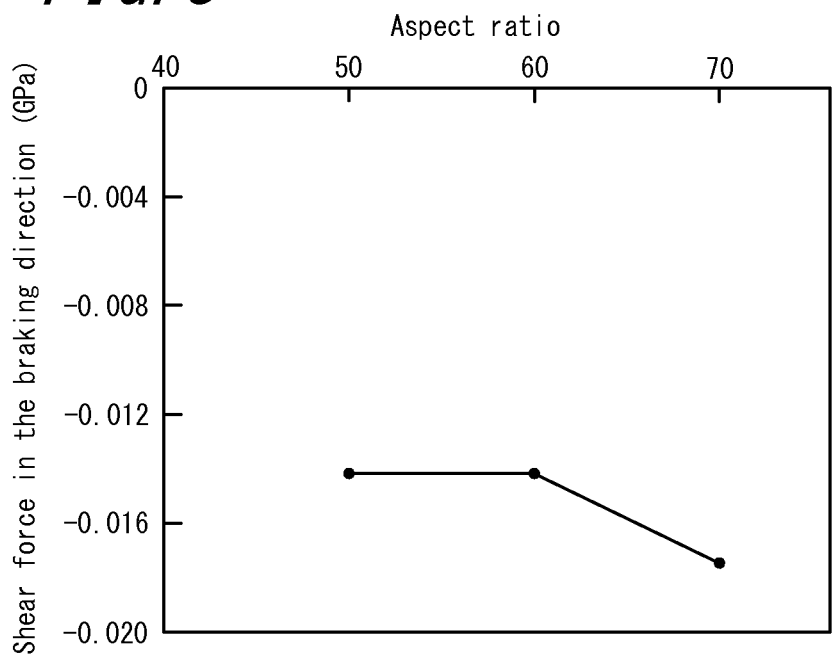
FIG. 3 is a graph illustrating the relationship between aspect ratio and shear force in the braking direction in my heavy load tire.

FIG. 3 shows that as the aspect ratio is reduced in my heavy load tire, the shear force in the braking direction approaches zero, thereby more effectively suppressing shoulder edge wear.

REFERENCE SIGNS LIST

1 Bead portion
2 Carcass

TABLE 1

| | | Example Tire 1 | Example Tire 2 | Example Tire 3 | Example Tire 4 | Example Tire 5 | Example Tire 6 | Example Tire 7 | Example Tire 8 | Example Tire 9 |
|---|---|---|---|---|---|---|---|---|---|---|
| First belt layer | cord inclination angle (°) | +50 | +50 | +50 | +50 | +50 | +50 | +50 | +50 | +50 |
| | $w_1/w$ (%) | 91 | 91 | 91 | 91 | 70 | 85 | 91 | 91 | 91 |
| Second belt layer | cord inclination angle (°) | 0 | 0 | 0 | 0 | 0 | 0 | 0 | 0 | 0 |
| | $w_2/w$ (%) | 74 | 74 | 74 | 74 | 60 | 74 | 74 | 74 | 74 |
| Third belt layer | cord inclination angle (°) | −16 | −16 | −16 | −16 | −16 | −16 | −16 | −16 | −30 |
| | $w_3/w$ (%) | 95 | 95 | 95 | 95 | 80 | 90 | 100 | 105 | 95 |
| Fourth belt layer | cord inclination angle (°) | +16 | — | +16 | −16 | +16 | +16 | +16 | +16 | +16 |
| | $w_4/w$ (%) | 46 | — | 85 | 46 | 46 | 46 | 46 | 46 | 46 |
| | Shoulder edge wear resistance | 129 | 118 | 132 | 115 | 110 | 118 | 131 | 131 | 115 |
| | Plunger durability | 135 | 129 | 134 | 130 | 129 | 131 | 135 | 135 | 133 |
| | Belt layer end durability | 98 | 100 | 82 | 103 | | | | | |
| | Steering stability | 110 | 100 | 115 | 102 | | | | | |

| | | Example Tire 10 | Example Tire 11 | Comparative Tire 1 | Comparative Tire 2 | Comparative Tire 3 | Comparative Tire 4 | Comparative Tire 5 |
|---|---|---|---|---|---|---|---|---|
| First belt layer | cord inclination angle (°) | +50 | +50 | +50 | +50 | +16 | +50 | 0 |
| | $w_1/w$ (%) | 100 | 91 | 91 | 91 | 91 | 60 | 74 |
| Second belt layer | cord inclination angle (°) | 0 | 0 | 0 | 0 | 0 | 0 | 0 |
| | $w_2/w$ (%) | 74 | 74 | 74 | 74 | 74 | 74 | 74 |
| Third belt layer | cord inclination angle (°) | −16 | −16 | −16 | −52 | −16 | −16 | +52 |
| | $w_3/w$ (%) | 105 | 95 | 74 | 95 | 95 | 95 | 95 |
| Fourth belt layer | cord inclination angle (°) | +16 | +16 | +16 | +16 | +16 | +16 | −52 |
| | $w_4/w$ (%) | 46 | 46 | 46 | 46 | 46 | 46 | 85 |
| | Shoulder edge wear resistance | 133 | 129 | 89 | 93 | 117 | 97 | 100 |
| | Plunger durability | 135 | 135 | 132 | 134 | 86 | 132 | 100 |
| | Belt layer end durability | | | | | | | |
| | Steering stability | | | | | | | |

From Table 1, it is clear that Example Tires 1 to 11 achieve both high plunger durability and high shoulder edge wear resistance. By contrast, Comparative Tires 1, 2, 4, and 5 clearly have worse shoulder edge wear resistance than Example Tires 1 to 11. Comparative Tire 3 also clearly has insufficient plunger durability.

Accordingly, these data show that Example Tires 1 to 11 can suppress shoulder edge wear while guaranteeing plunger durability.

Example Tires 1, 3, and 4 provided with the fourth belt layer also clearly have improved steering stability as compared to Example Tire 2, in which the fourth belt layer is not provided. In particular, in Example Tires 1 and 3, in which the cord of the fourth belt layer is inclined in the opposite direction from the third belt layer with respect to the tire circumferential direction, it is clear that the steering stability greatly improves.

Comparing Example Tires 1, 3, and 4, in which the fourth belt layer is provided, it is also clear that the belt layer end durability improves over that of Example Tire 2 in Example Tires 1 and 4, in which the width $w_4$ of the fourth belt layer is set smaller than the width $w_2$ of the second belt layer, and in which the width $w_4$ of the fourth belt layer is 70% or less of the tread width w.

Furthermore, the aspect ratio was 50 in the tires used in the above-described tests, yet FIG. 3 illustrates simulation 3a to 3d First to fourth belt layer
$w_1$ to $w_4$ Width of first to fourth belt layer
w Tread width
10 Heavy load tire

The invention claimed is:

1. A heavy load tire comprising:
a first belt layer comprising a cord extending at an inclination angle of greater than 45° with respect to a tire circumferential direction;
a second belt layer comprising a cord extending either in the tire circumferential direction or a direction different from the tire circumferential direction by less than 10°; and
a third belt layer comprising a cord extending at an inclination angle of 30° or less in an opposite direction from the cord of the first belt layer with respect to the tire circumferential direction;
a carcass extending toroidally between a pair of bead portions; and
a tread rubber having a ground contacting tread width w between tread edges, wherein
the first belt layer, second belt layer, and third belt layer are arranged in order, with the first belt layer furthest inward in a tire radial direction, on an outer circumferential side of a crown region of the carcass, a width $w_1$ of the third belt layer is 80% or more of the tread width w, and $w_2 < w_1 < w_3$, where $w_1$ is a width of the first belt layer, and $w_2$ is a width of the second belt layer, wherein the carcass is directly adjacent to the first belt layer in the tire radial direction, wherein the first belt layer is directly adjacent to the second belt layer in the tire radial direction, wherein the second belt layer is directly adjacent to the third belt layer in the tire radial direction, wherein the inclination angle of the cord in the third belt layer with respect to the tire circumferential direction is 25° or less, the inclination angle of the cord in the first belt layer with respect to the tire circumferential direction is 55° or less, and the width $w_1$ of the first belt layer is 100% or less of the tread width w, and wherein the width $w_1$ of the first belt layer is 85% or more of the tread width w.

2. The heavy load tire of claim 1, wherein the width $w_3$ of the third belt layer is 90% or more of the tread width w.

3. The heavy load tire of claim 1, further comprising, outward in the tire radial direction from the third belt layer, a fourth belt layer comprising a cord extending at an inclination with respect to the tire circumferential direction.

4. The heavy load tire of claim 3, wherein the cord in the fourth belt layer extends at an inclination angle in an opposite direction from the cord of the third belt layer with respect to the tire circumferential direction.

5. The heavy load tire of claim 4, wherein the inclination angle of the cord in the fourth belt layer with respect to the tire circumferential direction is 70° or less.

6. The heavy load tire of claim 5, wherein the inclination angle of the cord in the fourth belt layer with respect to the tire circumferential direction is 15° or more and 55° or less.

7. The heavy load tire of claim 3, wherein the fourth belt layer has a width $w_4$ and the width $w_4$ of the fourth belt layer is 20% or more of the tread width w.

8. The heavy load tire of claim 7, wherein the width $w_4$ of the fourth belt layer is 30% or more of the tread width w.

9. The heavy load tire of claim 3, wherein the width $w_4$ of the fourth belt layer is less than the width $w_2$ of the second belt layer.

10. The heavy load tire of claim 3, wherein the width $w_4$ of the fourth belt layer is 70% or less of the tread width w.

11. The heavy load tire of claim 10, wherein the width $w_4$ of the fourth belt layer is 55% or less of the tread width w.

12. The heavy load tire of claim 1, wherein the width $w_2$ of the second belt layer is 90% or less of the tread width w.

13. The heavy load tire of claim 12, wherein the width $w_2$ of the second belt layer is 85% or less of the tread width w.

14. The heavy load tire of claim 13, wherein the width $w_2$ of the second belt layer is 50% or more of the tread width w.

15. The heavy load tire of claim 1, wherein the width $w_3$ of the third belt layer is 105% or less of the tread width w.

16. The heavy load tire of claim 1, wherein the cord in the second layer extends in a wave pattern.

17. The heavy load tire of claim 1, wherein the inclination angle of the cord in the third belt layer with respect to the tire circumferential direction is 10° or more.

18. The heavy load tire of claim 1, wherein the inclination angle of the cord in the second belt layer with respect to the tire circumferential direction is 5° or less.

* * * * *